United States Patent [19]
Allport

[11] 3,857,084
[45] Dec. 24, 1974

[54] BATTERY CHARGING SYSTEMS

[75] Inventor: Maurice James Allport, Stourbridge, England

[73] Assignee: The Lucas Electrical Company Limited, Birmingham, England

[22] Filed: July 25, 1973

[21] Appl. No.: 382,381

[30] Foreign Application Priority Data
Mar. 8, 1972    Great Britain................ 36223/72

[52] U.S. Cl........................ 322/28, 320/64, 322/69
[51] Int. Cl. ............................................. H02j 7/16
[58] Field of Search ............ 320/61, 64, 68; 322/69, 322/70, 28

[56]    References Cited
UNITED STATES PATENTS

| | | | |
|---|---|---|---|
| 2,322,669 | 6/1943 | Shobert | 322/70 X |
| 2,848,679 | 8/1958 | Hochstetter | 322/70 X |
| 3,346,801 | 10/1967 | Reid et al. | 322/70 X |
| 3,515,978 | 6/1970 | Williams et al. | 320/64 X |

Primary Examiner—J. D. Miller
Assistant Examiner—Robert J. Hickey
Attorney, Agent, or Firm—Holman & Stern

[57]    ABSTRACT

A battery charging system has a wound field alternator charging a battery and a voltage regulator for controlling the output of the alternator by controlling conduction of a thyristor in series with the field winding of the alternator. The thyristor requires to be turned off periodically, and this is achieved by mechanical means, preferably in the form of a pair of interrupted slip rings feeding the field winding.

7 Claims, 1 Drawing Figure

PATENTED DEC 24 1974  3,857,084
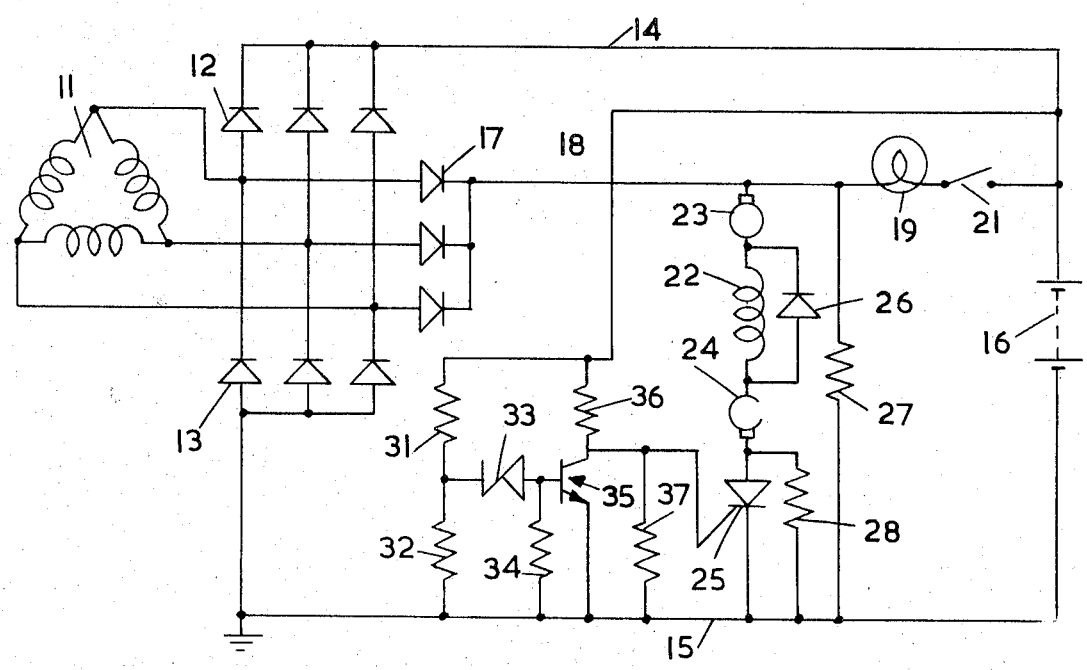

BATTERY CHARGING SYSTEMS

This invention relates to battery charging systems.

A system according to the invention includes a woundfield alternator charging a battery, and a voltage regulator for controlling the output of the alternator, the voltage regulator including a thyristor in series with the field winding of the alternator, means for providing gate current to the thyristor when the battery voltage is below a predetermined value, and the system further including mechanical means for interrupting the anode-cathode path of the thyristor from time-to-time to turn the thyristor off.

Preferably, the feed to the field winding is by way of a pair of slip rings, one of which is interrupted to provide the required mechanical means. In such an arrangement, then preferably the rotating field winding is bridged by a re-circulating diode which minimises arcing at the interrupted slip ring.

In the preferred arrangement, the alternator charges the battery through a full wave rectifier, and also provides power through additional diodes to a third supply line connected to the battery through a warning lamp and a manually operable switch in series, the series circuit of the field winding and thyristor being connected across the battery in series with the warning lamp and the manually operable switch. In such an arrangement, then preferably the series circuit of the field winding and thyristor is bridged by a resistor which provides a path to illuminate the warning lamp when the manually operable switch is closed but the slip rings stop with the thyristor circuit interrupted. Also, in such an arrangement then preferably a resistor is connected across the anode-cathode of the thyristor so that initial excitation can be applied to the field winding when the manually operable switch is closed but the thyristor is off.

In another aspect, the invention resides in a wound-field alternator for use in a system as specified in the preceding paragraphs, the wound-field alternator being characterised in that the ends of the field winding are connected to a pair of slip rings, one of which is interrupted. Preferably, in such an arrangement the alternator has a diode connected between the ends of the field winding.

The accompanying drawing is a circuit diagram illustrating one example of the invention.

Referring to the drawing, which shows the arrangement as applied to a road vehicle, there is provided a wound-field alternator 11 providing power through sets of diodes 12 and 13 to positive and negative supply lines 14, 15 between which the battery 16 of the vehicle is connected. The line 15 is earthed. The alternator also provides power through three additional diodes 17 to a supply line 18 which is connected to the positive battery terminal through a warning lamp 19 and the ignition switch 21 of the vehicle in series.

The alternator incorporates a field winding 22 one end of which is connected through a slip ring 23 to the line 18, and the other end of which is connected through a slip ring 24 to the anode of the thyristor 25 having its cathode connected to the line 15. The winding 22 is bridged by a re-circulating diode 26, and at least one of the slip rings is interrupted. In the drawing, the slip ring 24 is shown with an interruption. The line 18 is further connected to the line 15 through a resistor 27, and the anode-cathode path of the thyristor 25 is bridged by a resistor 28.

There are further provided a pair of resistors 31, 32 connected in series between the positive terminal of the battery 16 and the line 15. The junction of the resistors 31 and 32 is connected through a Zener diode 33 and a resistor 34 to the line 15, and the junction of the resistor 34 and Zener diode 33 is connected to the base of an n-p-n transistor 35, the collector of which is connected through a resistor 36 to the positive battery terminal, and through a resistor 37 to the line 15. A further connection is made from the collector of the transistor 35 to the gate of the thyristor 25.

Even when the ignition switch 21 is open, current can flow through the resistor 36 and the gate-cathode path of the thyristor 25, but this current flow is extremely small, and the thyristor 25 does not conduct. When the ignition switch 21 is closed, current flows through the switch 21 and the lamp 19, and then by way of the winding 22 and the thyristor 25 to the line 15, so that the lamp 19 is illuminated and initial excitation is provided for the winding 22. If the alternator has stopped with the interruption in the slip ring 24 opposite the brush engaged with the slip ring 24, then current cannot flow through the thyristor 25, but the lamp 19 is illuminated by virtue of current flow through the resistor 27. As soon as an attempt is made to start the engine, then angular movement of the slip ring 24 will provide the required initial excitation to the winding 22.

When the alternator is producing an output, the potential of the line 18 is approximately equal to the potential at the positive terminal of the battery 16, and so the warning lamp 19 is extinguished. Current is now supplied to the winding 22 from the line 18. As long as the voltage to the battery 16 is below a predetermined value, current can continue to flow through the resistor 36 to the gate-cathode path of the thyristor 25, and so the transistor 25 conducts until the slip ring 24 interrupts the supply to the anode of the thyristor 25, at which point the thyristor 25 turns off. However, current continues to flow in the winding 22 by virtue of the diode 26, and further angular movement of the slip ring 24 re-establishes the circuit to the anode of the thyristor 25, which turns on again. If, however, the battery voltage rises above a predetermined value, then the Zener diode 33 conducts and turns on the transistor 35, removing the gate current from the thyristor 25. Once gate current is removed from the thyristor 25, then the next time that the circuit to the anode of the thyristor 25 is interrupted, the thyristor 25 turns off, and does not turn on again when its anode circuit is re-established.

The resistor 28 may not be essential in all cases, but is provided to ensure that any leakage current across the gap in the slip ring 24 does not maintain the thyristor 25 conducting.

It is not of course necessary for the mechanical means to be associated with the slip rings of the alternator, although such an arrangement is preferred. The thyristor circuit could be broken mechanically in other ways, for example by any convenient form of contact breaker driven by a shaft associated with the alternator or the engine.

I claim:

1. A battery charging system including a wound-field alternator charging a battery, and a voltage regulator for controlling the output of the alternator, the voltage regulator including a thyristor in series with the field winding of the alternator, means for providing gate current to the thyristor when the battery voltage is below a predetermined value, and the system further including a pair of slip rings providing the required electrical connection to the field winding, one of said slip rings being interrupted so that the anode-cathode path of the thyristor is interrupted from time-to-time to turn the thyristor off.

2. A system as claimed in claim 1 in which the rotating field winding is bridged by a re-circulating diode which minimizes arcing at the interrupted slip ring.

3. A system as claimed in claim 1 in which the alternator charges the battery through a full wave rectifier, and also provides power through additional diodes to a third supply line connected to the battery through a warning lamp and a manually operable switch in series, the series circuit of the field winding and thyristor being connected across the battery in series with the warning lamp and the manually operable switch.

4. A system as claimed in claim 3 in which the series circuit of the field winding and thyristor is bridged by a resistor which provides a path to illuminate the warning lamp when the manually operable switch is closed but the slip rings stop with the thyristor circuit interrupted.

5. A system as claimed in claim 3 in which a resistor is connected across the anode-cathode of the thyristor so that initial excitation can be applied to the field winding when the manually operable switch is closed but the thyristor is off.

6. A wound-field alternator for use in a system as specified in claim 1, said alternator being characterised in that the ends of the field winding are connected to a pair of slip rings, one of which is interrupted.

7. An alternator as claimed in claim 6 having a diode connected between the ends of the field winding.

* * * * *